United States Patent
Aydin et al.

(10) Patent No.: US 10,861,054 B2
(45) Date of Patent: *Dec. 8, 2020

(54) HEURISTIC CUSTOMER CLUSTERING

(71) Applicant: Transform SR Brands LLC, Hoffman Estates, IL (US)

(72) Inventors: Burcu Aydin, Mountain View, CA (US); Michael Tamir, San Jose, CA (US)

(73) Assignee: TRANSFORM SR BRANDS LLC, Hoffman Estates, IL (US)

(*) Notice: Subject to any disclaimer, the term of this patent is extended or adjusted under 35 U.S.C. 154(b) by 0 days.

This patent is subject to a terminal disclaimer.

(21) Appl. No.: 16/524,938

(22) Filed: Jul. 29, 2019

(65) Prior Publication Data

US 2019/0355021 A1 Nov. 21, 2019

Related U.S. Application Data

(63) Continuation of application No. 14/083,815, filed on Nov. 19, 2013, now Pat. No. 10,366,420.

(51) Int. Cl.
*G06Q 30/02* (2012.01)
(52) U.S. Cl.
CPC ..... *G06Q 30/0269* (2013.01); *G06Q 30/0242* (2013.01)
(58) Field of Classification Search
None
See application file for complete search history.

(56) References Cited

U.S. PATENT DOCUMENTS

| | | | | |
|---|---|---|---|---|
| 6,134,555 A | * | 10/2000 | Chadha | G06F 16/285 |
| | | | | 707/737 |
| 6,490,582 B1 | * | 12/2002 | Fayyad | G06F 16/35 |
| | | | | 707/777 |
| 2010/0306029 A1 | * | 12/2010 | Jolley | G06Q 40/12 |
| | | | | 705/7.29 |

OTHER PUBLICATIONS

"Cluster Analysis", Wikipedia, dated Nov. 12, 2013, 19 pages.
"Cross-Validation (statistics)", Wikipedia, dated Nov. 12, 2013, 6 pages.
"K-Medoids", Wikipedia, dated Nov. 12, 2013, 7 pages.
"Logisic Regression", Wikipedia, dated Nov. 12, 2013, 18 pages.
"Maximum Likelihood", Wikipedia, dated Nov. 12, 2013, 14 pages.
"Principal Component Analysis", Wikipedia, dated Nov. 12, 2013, 16 pages.
"Silhouette (Clustering)", Wikipedia, dated Nov. 12, 2013, 2 pages.
"Support Vector Machine", Wikipedia, dated Nov. 12, 2013, 14 pages.

(Continued)

*Primary Examiner* — Sam Refai
(74) *Attorney, Agent, or Firm* — McAndrews, Held & Malloy, Ltd.

(57) ABSTRACT

Methods and apparatus are disclosed regarding an e-commerce system that places customers into a plurality of clusters and tailors services provided to a customer based on the cluster in which the customer is placed. In one embodiment, the e-commerce system defines the clusters based on purchase history data for customers having sufficient purchase history data. The e-commerce system then places customers without sufficient purchase history data into one of the defined clusters based on demographic data for the customer and demographic data for the customers in the cluster.

20 Claims, 8 Drawing Sheets

(56) References Cited

OTHER PUBLICATIONS

"Correlation and Dependence", Wikipedia, dated Nov. 14, 2013, 9 pages.
'Integer Programming', Wikipedia, dated Nov. 14, 2013, 6 pages.
"Jaccard Index", Wikipedia, dated Nov. 14, 2013, 5 pages.
"Minkowski Distance", Wikipedia, dated Nov. 14, 2013, 2 pages.

* cited by examiner

| Customer ID | Item ID | Transaction Date | Transaction Location | Quantity | Price |
|---|---|---|---|---|---|
| 100001 | 001 | 1/1/2013 | San Jose Sears | 1 | 10$ |

Fig. 6

| Customer ID | Category ID | Quantity |
|---|---|---|
| 100001 | 001 | 1 |
| 100001 | 001 | 2 |
| 100001 | 002 | 1 |

Fig. 7

| Customer ID | Category ID | Quantity |
|---|---|---|
| 100001 | 001 | 3 |
| 100001 | 002 | 1 |

Fig. 8

| 1 | 0 | 0 | 2 | 0 | 1 | 8 |
|---|---|---|---|---|---|---|

Fig. 9

| Units | Occurrence | Cumulative Occurrence | Quantile |
|---|---|---|---|
| 1 | 2 | 2 | 0.50 |
| 2 | 1 | 3 | 0.75 |
| 8 | 1 | 4 | 1.00 |

Fig. 10

| 0.50 |
|---|
| 0 |
| 0 |
| 0.75 |
| 0 |
| 0.50 |
| 1.00 |

Fig. 11

HEURISTIC CUSTOMER CLUSTERING

FIELD OF THE INVENTION

Various embodiments relate to electronic commerce (e-commerce), and more particularly, to classifying customers in an e-commerce environment.

BACKGROUND OF THE INVENTION

Electronic commerce (e-commerce) websites are an increasingly popular venue for consumers to research and purchase products without physically visiting a conventional brick-and-mortar retail store. An e-commerce website may provide products and/or services to a vast number of customers. As a result of providing such products and/or services, the e-commerce website may obtain extensive amounts of data about their customer base. Such customer data may aid the e-commerce website to provide products and/or services that are relevant and/or otherwise desirable to a particular customers.

In particular, an e-commerce website may attempt to identify groups of customers with similar interests or similar lifestyles. The e-commerce website may analyze these identified groups to derive generalizations regarding members of the group. The e-commerce website may then tailor its services to members of each group based upon the derived generalizations.

Limitations and disadvantages of conventional and traditional approaches should become apparent to one of skill in the art, through comparison of such systems with aspects of the present invention as set forth in the remainder of the present application.

BRIEF SUMMARY OF THE INVENTION

Apparatus and methods of classifying or grouping customers are substantially shown in and/or described in connection with at least one of the figures, and are set forth more completely in the claims.

These and other advantages, aspects and novel features of the present invention, as well as details of an illustrated embodiment thereof, will be more fully understood from the following description and drawings.

BRIEF DESCRIPTION OF SEVERAL VIEWS OF THE DRAWINGS

FIG. 6 shows an example entry of the purchase history data for the e-commerce system of FIG. 1.

FIG. 7 shows an example purchase history table for the e-commerce system of FIG. 1 after evaluating and retaining data of the purchase history data for a time window of interest.

FIG. 8 shows an example purchase history table for the e-commerce system of FIG. 1 after combining rows that correspond to the same customer and product category.

FIG. 9 shows an entry from an example customer-item (CI) matrix for the e-commerce system of FIG. 1.

FIG. 10 shows an example quantile table for the e-commerce system of FIG. 1.

FIG. 11 shows a standardized entry from the example quantile table of FIG. 10.

DETAILED DESCRIPTION OF THE INVENTION

Aspects of the present invention are related to classifying and/or grouping customers together that exhibit similar interests, lifestyles, and/or purchase behavior. More specifically, certain embodiments of the present invention relate to apparatus, hardware and/or software systems, and associated methods that place each customer of a customer base into a respective customer group based on either (i) the purchase history data for a particular customer, or (ii) demographic data for that customer and purchase history data for other customers with similar demographics.

Figure 1:
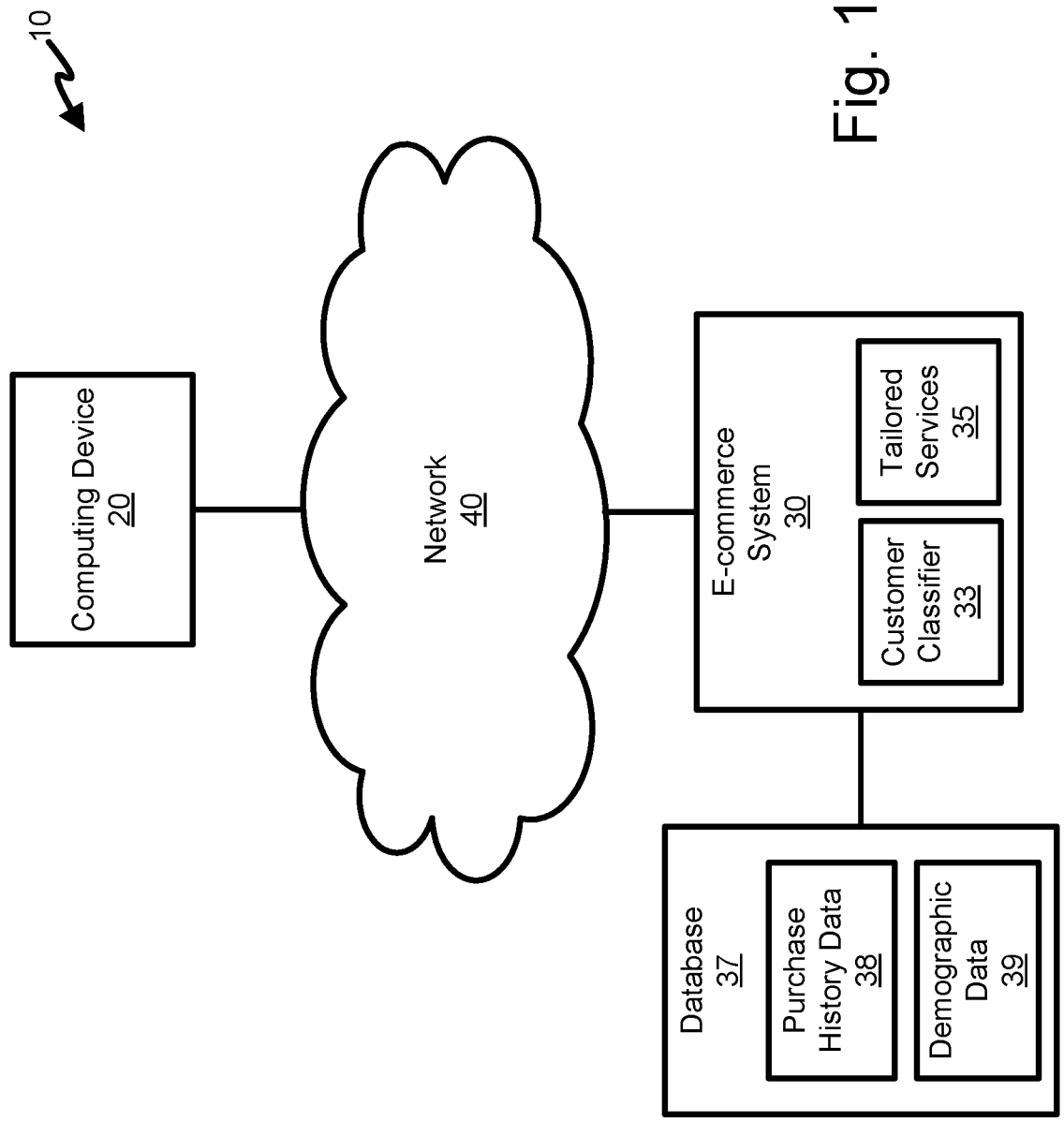
FIG. 1 shows an e-commerce environment comprising a computing device and an e-commerce system in accordance with an embodiment of the present invention.

Referring now to FIG. 1, an e-commerce environment 10 is depicted. As shown, the e-commerce environment 10 may include a computing device 20 connected to an e-commerce system 30 via a network 40. The network 40 may include a number of private and/or public networks such as, for example, wireless and/or wired LAN networks, cellular networks, and the Internet that collectively provide a communication path and/or paths between the computing device 20 and the e-commerce system 30. The computing device 20 may include a desktop, a laptop, a tablet, a smart phone, and/or some other type of computing device which enables a user to communicate with the e-commerce system 30 via the network 40. The e-commerce system 30 may include one or more web servers, database servers, routers, load balancers, and/or other computing and/or networking devices that operate to provide an e-commerce experience for users that connect to the e-commerce system 30 via the computing device 20 and the network 40.

The e-commerce system 30 may further include a customer classifier 33, one or more tailored services 35, and one or more electronic databases 37 upon which are stored purchase history data 38 and demographic data 39 for customers of the e-commerce system 30. The classifier 33 may include one or more firmware and/or software instructions, routines, modules, etc. that the e-commerce system 30 may execute in order to classify, group, or cluster customers of the e-commerce system 30 into classes, groups, or clusters of customers that exhibit similar purchasing habits. The classifier 33 may analyze purchase histories of high-purchasing customers to identify clusters of customers with similar purchasing preferences. The classifier 33 may further analyze demographic data of customers in each of the identified clusters to obtain demographic classification rules that may be used to place low-purchasing customers into appropriate clusters.

The tailored services 35 may comprise one or more firmware and/or software instructions, routines, modules, etc. that the e-commerce system 30 may execute in order to tailor one or more aspects of the e-commerce system 30 for a particular customer. The tailored services 35 may include advertisements, promotions, product recommendations, email campaigns, etc. that are tailored based upon the cluster to which the customer has been placed. In one embodiment, the tailored services 35 bifurcates the customers based on the amount of purchase history data the e-commerce system 30 has for the customer. In particular, the e-commerce system 30 may tailor the services 35 for customers with sufficient purchase history data based on an analysis of such purchase history data for the customer. Alternatively, the e-commerce system 30 may tailor the services 35 for customers with insufficient purchase history data based on demographic data for the customer and demographic data for customers with sufficient purchase history data.

The classifier 33 and tailored services 35 may be executed concurrently by a single computing device of the e-commerce system 30. However, in some embodiments, a computing device may execute the classifier 33 offline in order to obtain appropriate clusters and other input data for the tailored services 35. Moreover, the classifier 33 may periodically (e.g., once an hour, once a day, once a week, etc.) provide one or more of the tailored services 35 with updated cluster and other input data. In this manner, the e-commerce system 30 may continue to provide tailored services 35 without the constant overhead of the classifier 33 and/or without the overhead of constant updates. For example, the e-commerce system 30 may execute the classifier 33 only during generally idle periods (e.g., after normal business hours). Further details regarding the classifier 33 and the tailored services 35 are presented below in regard to FIGS. 5-11.

FIG. 1 depicts a simplified embodiment of the e-commerce environment 10 which may be implemented in numerous different manners using a wide range of different computing devices, platforms, networks, etc. Moreover, while aspects of the e-commerce environment 10 may be implemented using a client/server architecture, aspects of the e-commerce may be implemented using a peer-to-peer architecture or another networking architecture.

Figure 2:
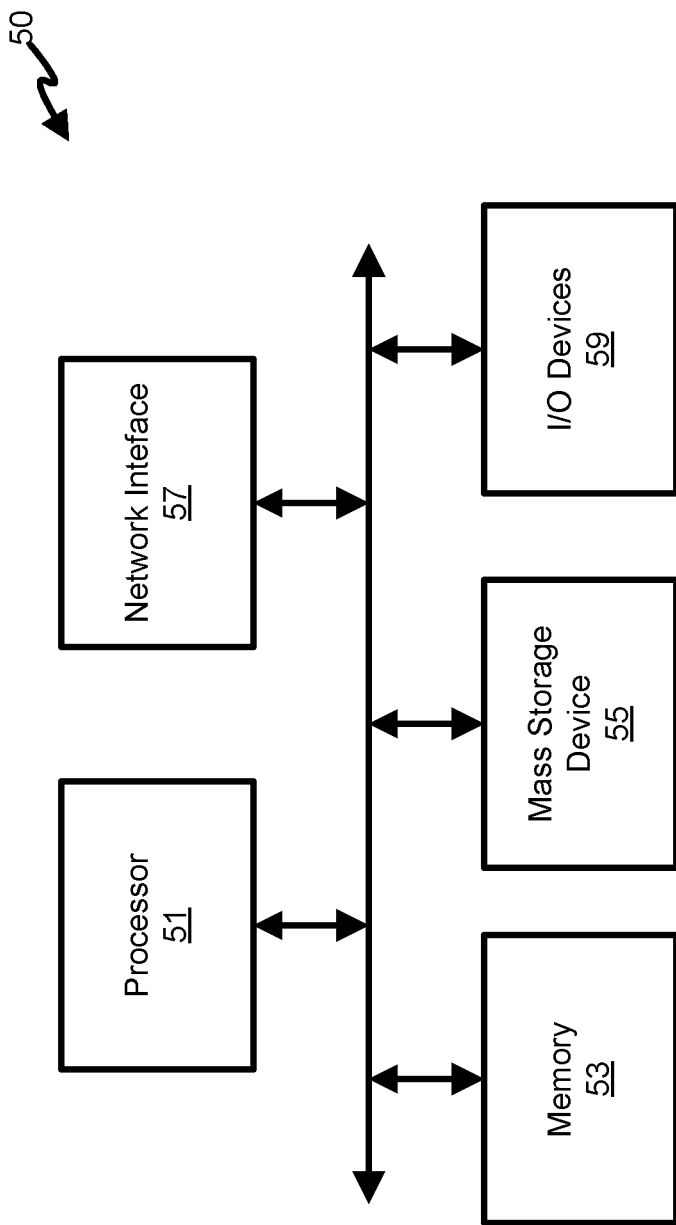
FIG. 2 shows an embodiment of a computing device for use in the e-commerce environment of FIG. 1.

As noted above, the e-commerce system 30 may include one or more computing devices. FIG. 2 depicts an embodiment of a computing device 50 suitable for the computing device 20 and/or the e-commerce system 30. As shown, the computing device 50 may include a processor 51, a memory 53, a mass storage device 55, a network interface 57, and various input/output (I/O) devices 59. The processor 51 may be configured to execute instructions, manipulate data and generally control operation of other components of the computing device 50 as a result of its execution. To this end, the processor 51 may include a general purpose processor such as an x86 processor or an ARM processor which are available from various vendors. However, the processor 51 may also be implemented using an application specific processor and/or other logic circuitry.

The memory 53 may store instructions and/or data to be executed and/or otherwise accessed by the processor 51. In some embodiments, the memory 53 may be completely and/or partially integrated with the processor 51.

In general, the mass storage device 55 may store software and/or firmware instructions which may be loaded in memory 53 and executed by processor 51. The mass storage device 55 may further store various types of data which the processor 51 may access, modify, and/otherwise manipulate in response to executing instructions from memory 53. To this end, the mass storage device 55 may comprise one or more redundant array of independent disks (RAID) devices, traditional hard disk drives (HDD), solid-state device (SSD) drives, flash memory devices, read only memory (ROM) devices, etc.

The network interface 57 may enable the computing device 50 to communicate with other computing devices directly and/or via network 40. To this end, the networking interface 57 may include a wired networking interface such as an Ethernet (IEEE 802.3) interface, a wireless networking interface such as a WiFi (IEEE 802.11) interface, a radio or mobile interface such as a cellular interface (GSM, CDMA, LTE, etc), and/or some other type of networking interface capable of providing a communications link between the computing device 50 and network 40 and/or another computing device.

Finally, the I/O devices 59 may generally provide devices which enable a user to interact with the computing device 50 by either receiving information from the computing device 50 and/or providing information to the computing device 50. For example, the I/O devices 59 may include display screens, keyboards, mice, touch screens, microphones, audio speakers, etc.

While the above provides general aspects of a computing device 50, those skilled in the art readily appreciate that there may be significant variation in actual implementations of a computing device. For example, a smart phone implementation of a computing device may use vastly different components and may have a vastly different architecture than a database server implementation of a computing device. However, despite such differences, computing devices generally include processors that execute software and/or firmware instructions in order to implement various functionality. As such, aspects of the present application may find utility across a vast array of different computing devices and the intention is not to limit the scope of the present application to a specific computing device and/or computing platform beyond any such limits that may be found in the appended claims.

Figure 3:
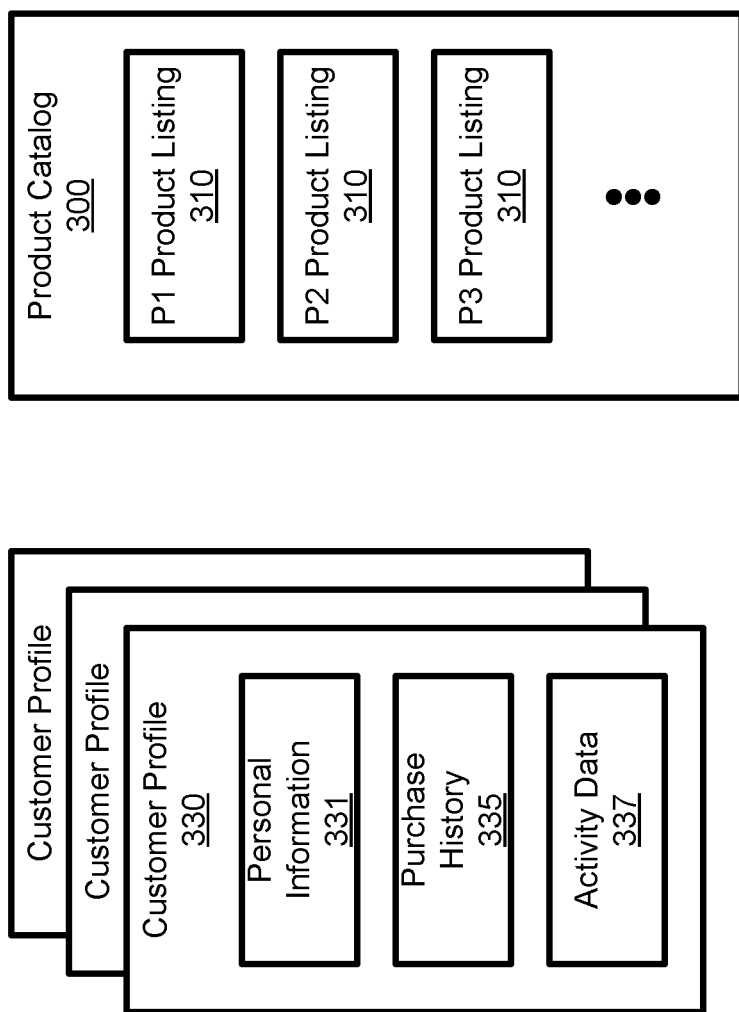
FIG. 3 shows user profiles and product catalogs maintained by an e-commerce system of FIG. 1.

As part of the provided e-commerce experience, the e-commerce system 30 may enable customers, which may be guests or members of the e-commerce system 30, to browse and/or otherwise locate products. The e-commerce system 30 may further enable such customers to purchase products offered for sale. To this end, the e-commerce system 30 may maintain an electronic product database or product catalog 300 which may be stored on an associated mass storage device 55. As shown in FIG. 3, the product catalog 300 includes product listings 310 for each product available for purchase. Each product listing 310 may include various information or attributes regarding the respective product, such as a unique product identifier (e.g., stock-keeping unit "SKU"), a product description, product image (s), manufacture information, available quantity, price, product features, etc. Moreover, while the e-commerce system 30 may enable guests to purchase products without registering and/or otherwise signing-up for a membership, the e-commerce system 30 may provide additional and/or enhanced functionality to those users that become a member.

To this end, the e-commerce system 30 may enable members to create a customer profile 330. As shown, a customer profile 330 may include personal information 331, purchase history data 335, and other customer activity data 337. The personal information 331 may include such items as name, mailing address, email address, phone number, billing information, clothing sizes, birthdates of friends and family, etc. The purchase history data 335 may include information regarding products previously purchased by the customer from the e-commerce system 30. The customer history data 335 may further include products previously purchased from affiliated online and brick-and-mortar vendors.

The other customer activity data 337 may include information regarding prior customer activities such as products for which the customer has previously searched, products for which the customer has previously viewed, products for which the customer has provide comments, products for which the customer has rated, products for which the customer has written reviews, etc. and/or purchased from the e-commerce system 30. The other customer activity data 337 may further include similar activities associated with affiliated online and brick-and-mortar vendors.

Figure 4:
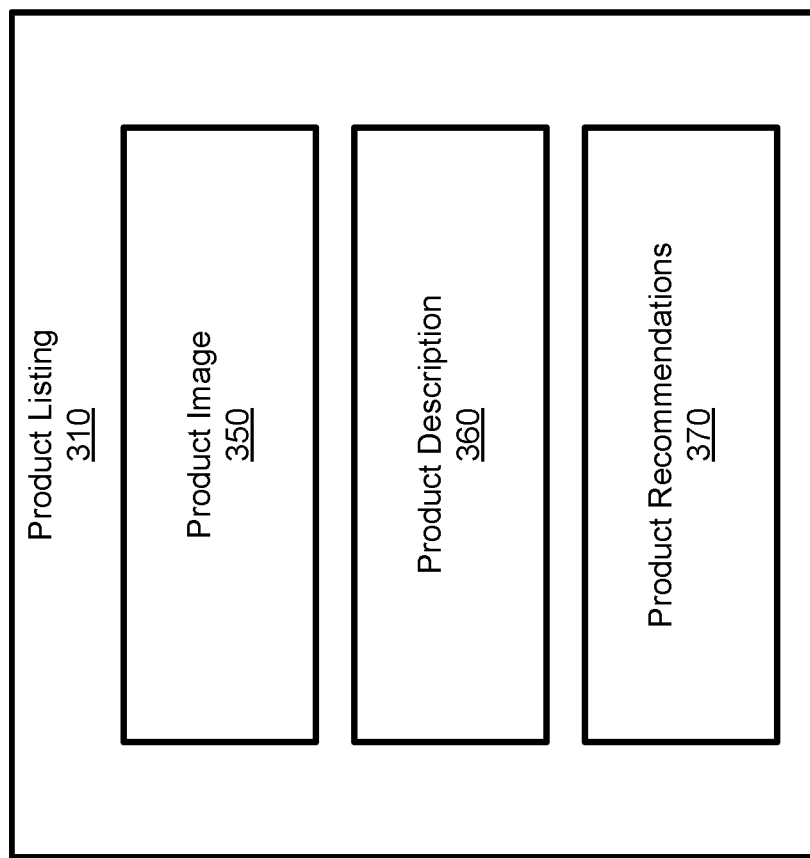
FIG. 4 shows an embodiment of a product listing provided by the e-commerce system of FIG. 1.

As part of the e-commerce experience, the e-commerce system 30 may cause a computing device 10 to display a product listing 310 as shown in FIG. 4. In particular, the e-commerce system 30 may provide such a product listing 310 in response to a member browsing products by type, price, kind, etc., viewing a list of products obtained from a product search, and/or other techniques supported by the e-commerce system 30 for locating products of interest. As shown, the product listing 310 may include one or more representative images 350 of the product as well as a product description 360. The product listing 310 may further include one or more products 370 recommended by a recommendation engine of the tailored services 35. In particular, the recommendation engine may provide product recommendations based on the personal information 331, purchase history data 335 and/or activity data 337.

Figure 5:
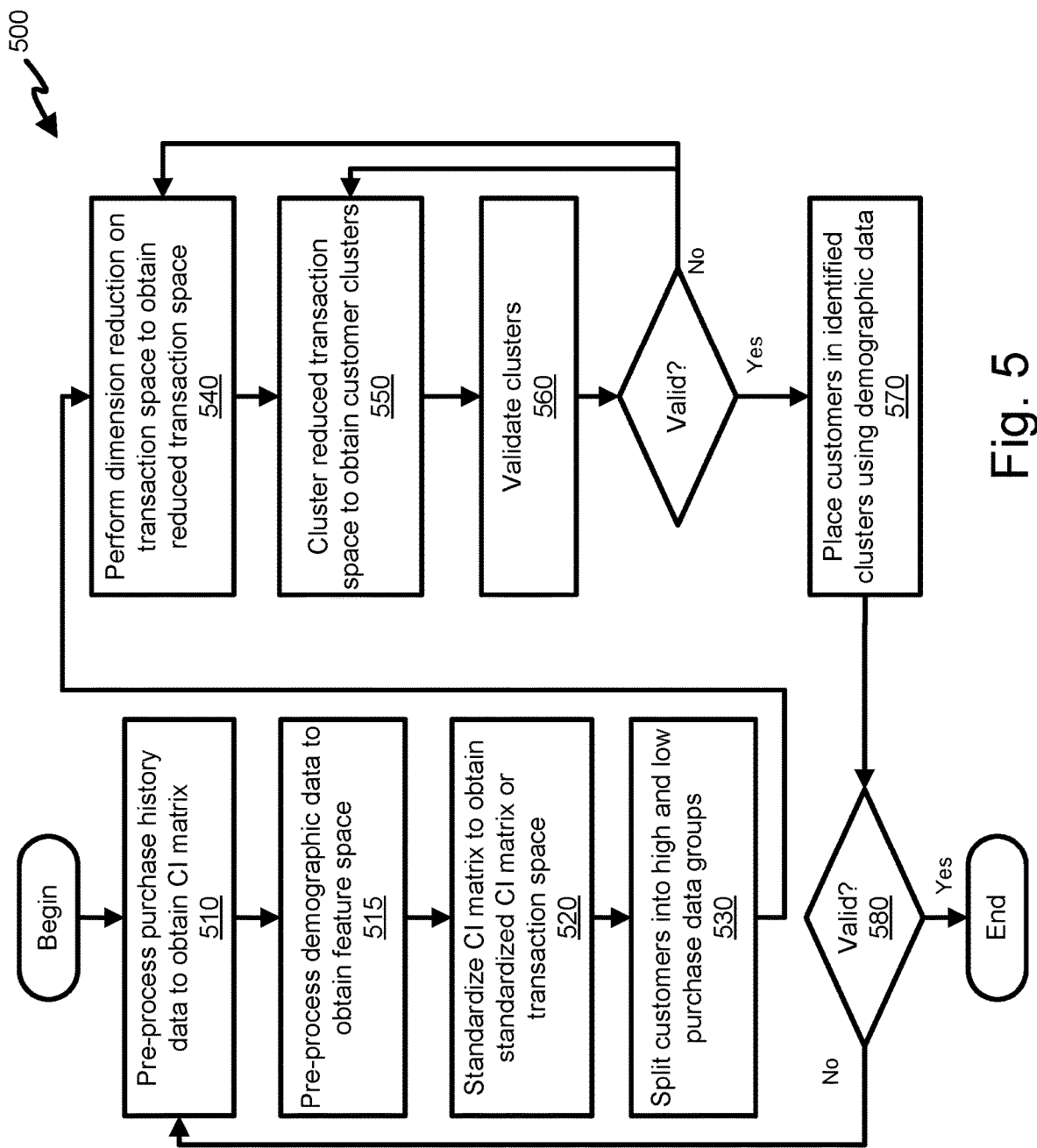
FIG. 5 shows a flowchart for an embodiment of a customer grouping process that may be used by the e-commerce system of FIG. 1.

Referring now to FIG. 5, a customer grouping and/or clustering process 500 that may be implemented by the e-commerce system 30 is shown. At 510, the classifier 33 may preprocess purchase history data 335 to obtain a Customer-Item (CI) matrix. The e-commerce system 30 may collect and maintain purchase history data 335 for the customer over a period of time. The e-commerce system 30 may further collect demographic data from the customer such as personal information 331 provided in the customers profile 330. However, the e-commerce system 30 may further obtain demographic data for customers from various providers of demographic data. The purchase history data, in its raw form, may include information recorded for each purchase. An example entry is shown in FIG. 6. As shown, the e-commerce system 30 may maintain the purchase history data 335 in one or more relational database tables. Each row of the purchase history table may include a row for each transaction, and each row may include a customer identifier (ID) that uniquely identifies the customer associated with the corresponding transaction.

At 510, the classifier 33 may preprocess the raw purchase history information found in the purchase history table into a Customer-Item space. To this end, the classifier 33 may select a time window (e.g., the most recent 24 months). The classifier 33 may extract entries from the purchase history table that have a transaction date that falls within the selected time window. The classifier 33 may then discard all fields other than the Customer ID, Item ID and Quantity of that particular item purchased in that transaction.

Many e-commerce sites maintain a product hierarchy of product identifiers where the Item ID corresponds to the lowest level of such hierarchy and various Category IDs lie higher up in the product hierarchy. Moreover, in many environments, the Item IDs are at such a fine a granularity that correlations between purchases may be lost. In such situations, the classifier 33 may be configured to coalesce purchased items of multiple Item IDs under a single Category ID that lies at a high level in the product hierarchy.

FIG. 7 shows an example table after evaluating the time window as described above. As may be seen from FIG. 7, the resulting table may still include multiple entries or rows for each Customer ID and Category ID pair. The classifier 33 may apply a pivoting step to the resulting table in order to combine rows having the same Customer ID and Category ID pair into a single row. As shown in FIG. 8, the resulting table includes a single row for each Customer ID and Category ID pair and includes Quantity data that contains the sum of all purchased quantities for this ID pair.

From the table shown in FIG. 8, the classifier 33 may create a Customer-Item (CI) matrix. In the CI matrix, each row i corresponds to a unique Customer ID, each column j corresponds to a unique Category ID, and the entry $CI_{ij}$ corresponds to the quantity of this Customer ID and Category ID pair from the table shown in FIG. 7. If a particular customer did not purchase from a product in a category of CI matrix, then corresponding entry is zero.

At 515, the classifier 33 may further preprocess the demographic data of its customers to obtain a feature space. In particular, the classifier 33 may maintain and/or create a demographic table. The demographic table may include a row for each Customer ID. Moreover, each column of the table may represent a different feature such, as for example, age, gender, occupation, number of children, etc. During preprocessing, the classifier 33 may turn each demographic entry into a numerical value. For example, the "Gender" column may contain only two kinds of entries, male and female. The classifier 33 may preprocess the demographic table such that that Gender column includes a 1 for each female customer and a 0 otherwise. The preprocessed demographic table may form the feature space for later classification.

After preprocessing the purchase history and demographic data, the classifier 33 at 520 may standardize the CI matrix to obtain a standardize CI matrix which is referred to as transaction space. Standardizing the CI Matrix may ensure that the columns of the standardized CI matrix are scale-wise comparable with each other. In one embodiment, the classifier 33 applies standardization to each column separately using a bin quantiles standardization (BQS) technique. However, other standardization techniques may be utilized.

To illustrate the BQS technique, one example column of the CI matrix is shown in FIG. 9. If depicted column corresponds to a category ID CID in the CI matrix, then the information in column suggests that customer 1 bought 1 unit of an item corresponding to category ID, customer 4 bought 2 items, customer 6 bought 1 item, and customer 7 bought 8 items. The classifier 33 in accordance with the BQS technique may traverse the column, record every unique quantity except zero that appears along with how many times each unique quantity appears in the column. The classifier 33 may sort the results based on occurrence of each unique quantity. See, e.g., the Occurrences column of FIG. 10. The classifier 33 may traverse the occurrences to obtain a cumulative sum of the number of occurrences. See, e.g., Cumulative Occurrences column of FIG. 10. Furthermore, the classifier 33 for each row may divide the respective cumulative occurrence value by the last number in the cumulative occurrence column (i.e., the total number of occurrences) to obtain the quantile value for that row. See, e.g., Quantile column of FIG. 10.

The BQS result shown in FIG. 10 suggests that the customers who bought 1 item associated with the category ID constitute the first 50% quantile, customers who bought 2 or less such items are the 75% quantile, and customers who bought 8 or less such items are the 100% quantile. The classifier 33 may then update the quantity values of the original column with their corresponding quantile values as shown in FIG. 11 to obtain the standardized column.

The BQS technique may provide two advantages. One, all the numbers in the columns of CI matrix are guaranteed to be between 0 and 1, therefore the purchase patterns of high-frequency items such as grocery items and a low-frequency items such as expensive electronics items are comparable. Second, because the quantile values are thought in terms of frequencies of each number appearing and their relative order rather than their nominal values, the occasional very large number observed in the columns do not skew the analysis.

Many customers of the e-commerce system 30 may not have enough purchase history data 335 to be meaningfully clustered with other customers of the e-commerce system 30 based on their past purchase behavior. Accordingly, the classifier 33 at 530 may utilizing one or more rules to split the customer base into high-purchasing customers with enough purchase history data 335 to provide meaningful insight into their purchase behavior and low-purchasing customers who lack enough purchase history data 335 to provide such meaningful insight.

The classifier 33 may utilize various types of splitting rules to identify and/or classify customers into these two groups. For example, the classifier 33 may count overall number of transactions of each customer within the time period of interest, and separate the customers with transaction counts higher than a pre-defined number. As another example, the classifier 33 may measure the variety of products purchased by each customer, and separate the customers based upon a determined threshold of the measured variety. In accordance with a third example, the classifier 33 may place a certain percent of the customers who have the most frequent purchases in the period of interest into the high-purchasing customers group.

Splitting the customer base into two may have the following advantages. Customer clusters are intended to group together customers with similar purchase habits and preferences. Thus, the classifier 33 may attempt to customers with similar purchase patterns together in the same cluster, even if their certain demographic characteristics happen to be different. Therefore, the classifier 33 may obtain better classification results for the tailored services 35 by defining the clusters based on purchase history data 335. Product recommendations based on purchase history data 335 thus should work well for the high-purchasing group.

The second or low-purchasing group of customers, who lack reliable purchase history data 335, may be still assigned to clusters based on demographic similarities. Consider a group of customers who frequently shop for school supplies. Due to the commonalities in their shopping pattern, such customers may be placed into the same cluster. Now consider a new customer without sufficient purchase history 335, but whose demographic data indicates that he/she has school-age children. The classifier 33 may identify such information as a common characteristic with the customers already assigned to the cluster, and the classifier 33 may place the new customer into this cluster, and the tailored services 35 may possibly target the customers in this cluster with back-to-school deals and coupons.

To this end, the classifier 33 at 540 may reduce the dimensional space of the standardize CI matrix or transaction space. In particular, the classifier 33 is concerned with reducing the dimensions of the standardized CI matrix for the high-purchasing customer group because clustering algorithms generally do not perform well in high dimensional spaces. The transaction space defined by standardized CI matrix has as many dimensions as the number of category IDs in the set. In a retail setting, the number of category IDs may be in the thousands. Accordingly, the classifier 33 may attempt to transform the transaction space in a manner that retains as much information as possible regarding predictive customer purchasing behavior while reducing the dimensionality.

To this end, the classifier 33 may apply principal component analysis (PCA) to the transaction space data. PCA comprises an orthogonal transformation that converts a set of observations of possibly correlated variables into a set of values of linearly uncorrelated variables called principal components. In the instant case, the classifier 33 may use PCA to rotate the basis of the transaction space, so that in the transformed space, the first few basis vectors (principal components) define a subspace in which most of the variation within the transaction space data lies. The transaction space data projected onto the subspace with limited dimensions is an input to the following clustering operation and is referred to as the reduced CI matrix or reduced transaction space.

At 550, the classifier 33 may utilizes a clustering algorithm on the reduced CI matrix to obtain a number of clusters k. In one embodiment, the classifier 33 employs two clustering algorithms called Partitioning Around Medoids (PAM) and Clustering Large Applications (CLARA). However, other embodiments may employ other clustering algorithms. The PAM clustering algorithm is a heuristic method that aims to select m points called medoids from the data set. The m points or medoids are selected so that the sum of distances of each point in the data set to its nearest medoid is minimum. In one embodiment, the classifier 33 uses Euclidean distance as the distance metric for determining the nearest medoid.

The PAM clustering algorithm may be preferable to other clustering algorithms for this application, since the results of the PAM clustering algorithm appear to be robust against outliers and the clusters appear to be stable. The run time of the PAM clustering algorithm is polynomially dependent on the size of the input. However, for very large data sets, the memory requirements of the PAM clustering algorithm may become prohibitive. To overcome the potential memory requirement issue, the classifier 33 further utilizes the CLARA clustering algorithm. The classifier 33 in accordance with the CLARA clustering algorithm may generate many samples of the data set, where each of these samples is of a size that the PAM clustering algorithm can handle with reasonable memory requirements. The classifier 33 may apply the PAM clustering algorithm to each of these samples to obtain m medoids per sample. For each obtained medoid set, the classifier 33 may calculate the sum of distances of all the data points to the nearest medoid of the set. The classifier 33 may then use the CLARA clustering algorithm to output the medoid set with the smallest sum of distances. The classifier 33 may use this output medoid set to determine the clusters such that every customer is assigned to the cluster of the closest representing medoid.

After clustering the reduced transaction space, the classifier 33 may test the validity and robustness of the obtained clusters at 560. Furthermore, the choice of the number of clusters k made in 550 is tested, and if necessary, adjusted. While other validation techniques may be used, the classifier 33 in one embodiment measures the silhouette of every candidate clustering result. The average silhouette may be roughly described as the average probability of the points in the data having been assigned to the correct cluster core and is represented by a number between −1 and 1. Positive silhouette numbers indicate that the clusters are well-separated and the cluster cores (medoids) are correctly chosen. Low average silhouette numbers may be caused by using an incorrect number of clusters k, using data that is not naturally well-clustered and thus the clustering algorithm doing a poor job of finding suitable clusters, or having data in a too high-dimensional space.

One way to choose a suitable number of clusters k is to perform the clustering at 550 multiple times using different number of clusters k's, and then selecting the number of clusters k that obtains the best silhouette results. For example, in a particular application conducted for a retail store, the classifier 33 employed the above described iterative approach and found that 60 clusters were a suitable number of clusters for the purchase history data 335 analyzed.

If the silhouette numbers obtained at 560 for the number of clusters k are still not satisfactory, then the classifier 33 may return to previous steps and re-tune the parameters and the methods used in an attempt to obtain better results. For example, the number of dimensions selected at 540 may be changed, a different clustering method may be tried at 550, or some other parameters and/or methods may be altered until satisfactory clusters are identified.

Once suitable silhouette numbers are obtained and the clusters validated, the classifier 33 has a list of clusters as well as a vector that indicates which cluster each of high-purchasing customer belongs. The classifier 33 may then utilize these clusters and vector at 570 to assign each low-purchasing customers to an appropriate cluster. In particular, the classifier 33 may assign customers with insufficient purchase history data 335 to the clusters obtained at 560 based the obtained clustering vector for the high-purchase customers and demographic data of both the high-purchase customers and the low-purchase customers. To the end, the classifier 33 may determine rules that associate demographic characteristics to the obtained clusters. In particular, the classifier 33 may use a machine learning classification algorithm to analyze the clustering vector and the demographic information. For example, if one of the clusters seems to consist of middle age people with multiple children, the classifier 33 via the classification algorithm may learn this relationship between demographic data and the particular cluster, and may identify an age range and a number of children range as an indicator of the particular cluster. In one embodiment, the classifier 33 performs such classification of the low-purchase customers using support vector machines. However, the classifier 33 in other embodiments may utilize a different classification algorithm such as logistic regression or maximum likelihood based algorithms.

In one embodiment, the classifier 33 may use multiple classification methods, and may select the classification that provides the best results. To this end, the classifier 33 may use a cross-validation algorithm to ascertain the quality of the classification results. In accordance with the cross-validation algorithm, the classifier 33 may divide the training data into portions, run the classification method on one portion, and test if the results are able to recover the response variable of the remaining portion. In one embodiment, the classifier 33 may use k-fold cross validation which is widely regarded as a robust cross-validation algorithm. However, the classifier 33 may utilize other cross-validation algorithms as well. After validation, the classifier 33 may assign each of the low-purchase customers to their demographically closest clusters based on the rules generated by the chosen classification algorithm.

Finally, the classifier 33 may validate the final clusters at 580 using market testing. In particular, the classifier 33 may use A/B testing to validate the clusters. For A/B testing, the classifier 33 may select a large number of customer samples from the whole customer base. The classifier 33 may then proceed to cluster some samples using the above described methods, and randomly cluster other samples.

The tailored services 35 may then proceeds to provide services tailored based on each of these samples. The classifier 33 may then compare metrics of services provided to each of the samples. Example metrics may include click-through rates, redemption rates, and/or traffic volume generated. The classifier 33 may conduct the experiment for a pre-determined amount of time, or until statistically significant results are reached. The validity of the clustering method is verified using appropriate statistical methods to determine if the metrics obtained using the sample clustered using the above techniques is significantly better than the sample that is randomly clustered.

As a result of the above, the classifier 33 appropriately clusters the customers of the e-commerce system 30 regardless of whether the customers are high-purchasing customers having significant purchase history data 335 or low-purchasing customers having no purchase history data 335 or insufficient purchase history data 335. The tailored services 35 may then provide each customer with services tailored based upon their identified cluster. In this manner, the tailored services 35 may alter or tailor the services provided to each customer based on either (i) purchase history data for the respective customer, or (ii) demographic data for the respective customer and purchase history of customers with similar demographic data.

Various embodiments of the invention have been described herein by way of example and not by way of limitation in the accompanying figures. For clarity of illustration, exemplary elements illustrated in the figures may not necessarily be drawn to scale. In this regard, for example, the dimensions of some of the elements may be exaggerated relative to other elements to provide clarity. Furthermore, where considered appropriate, reference labels have been repeated among the figures to indicate corresponding or analogous elements.

Moreover, certain embodiments may be implemented as a plurality of instructions on a non-transitory, computer readable storage medium such as, for example, flash memory devices, hard disk devices, compact disc media, DVD media, EEPROMs, etc. Such instructions, when executed by one or more computing devices, may result in the one or more computing devices identifying customer clusters based on customers with sufficient purchase history data and placing customers with insufficient purchase history data in to the identified clusters based on demographic data for the customer and the demographic data for the customers in the clusters.

While the present invention has been described with reference to certain embodiments, it will be understood by those skilled in the art that various changes may be made and equivalents may be substituted without departing from the scope of the present invention. For example, the above embodiments were described primarily from the standpoint of an e-commerce environment. However, it should be appreciated that clustering of customers may be useful in other environments as well. For example, a brick-and-mortar store may cluster customers in order to provide targeted mailing, coupons, and/or other types of promotions to its customers. In addition, many modifications may be made to adapt a particular situation or material to the teachings of the present invention without departing from its scope. Therefore, it is intended that the present invention not be limited to the particular embodiment or embodiments disclosed, but that the present invention encompasses all embodiments falling within the scope of the appended claims.

What is claimed is:

1. A method for clustering customers using a computing device having limited memory capacity, the method comprising:
    splitting the customers into a first group comprising first customers who have conducted greater than a predetermined number of transactions and a second group comprising second customers who have not conducted greater than the predetermined number of transactions;
    generating, based on transaction data of the first customers, a matrix that relates first customers to purchased products;
    applying principal component analysis to the matrix to obtain a reduced matrix for the first customers;
    generating, in accordance with a clustering large applications (CLARA) algorithm, a plurality of sample sets of the reduced matrix;
    applying a partitioning around medoids (PAM) clustering algorithm to each of the plurality of sample sets to obtain a plurality of medoid sets comprising a medoid set per sample set;
    clustering the first customers into a plurality of clusters based upon a medoid set of the plurality of medoid sets; and
    placing each second customer into a cluster of the plurality of clusters based on demographic data for the respective second customer and demographic data for the first customers placed in each respective cluster.

2. The method of claim 1, further comprising validating the plurality of clusters prior to placing each second customer into a cluster.

3. The method of claim 1, further comprising recalibrating a quantity of dimensions of the reduced matrix until cluster validation determines the plurality of clusters are a valid clustering of the first customers.

4. The method of claim 1, further comprising recalibrating a quantity of clusters used by the clustering until cluster validation determines the plurality of clusters are a valid clustering of the first customers.

5. The method of claim 1, further comprising:
    generating silhouette numbers for the first customers; and
    determining, based on the silhouette numbers for the first customers, that the plurality of clusters are a valid clustering of the first customers.

6. The method of claim 1, further comprising:
    calculating, for each medoid set, a sum of distances to a nearest medoid of the medoid set; and
    defining the clusters of the plurality of clusters based on the medoid set that has a smallest sum of distances.

7. The method of claim 1, further comprising:
    calculating, for each medoid set, a sum of Euclidean distances to a nearest medoid of the medoid set; and
    defining the plurality of clusters based on the medoid set that has a smallest sum of Euclidean distances.

8. A non-transitory computer-readable medium, comprising a plurality of instructions, that in response to being executed, result in a computing device:
    splitting customers into a first group comprising first customers who have conducted greater than a predetermined number of transactions and a second group comprising second customers who have not conducted greater than the predetermined number of transactions;
    generating, based on transaction data of the first customers, a matrix that relates the first customers to purchased products;
    applying principal component analysis to the matrix to obtain a reduced matrix for the first customers;
    generating, in accordance with a clustering large applications (CLARA) algorithm, a plurality of sample sets of the reduced matrix;
    applying a partitioning around medoids (PAM) clustering algorithm to each of the plurality of sample sets to obtain a plurality of medoid sets comprising a medoid set per sample set;
    clustering the first customers into a plurality of clusters based upon a medoid set of the plurality of medoid sets; and
    placing each second customer into a cluster of the plurality of clusters based on demographic data for the respective second customer and demographic data for the first customers placed in the respective cluster.

9. The non-transitory computer-readable medium of claim 8, further comprising instructions that result in the computing device validating the plurality of clusters prior to the placing each second customer into a cluster.

10. The non-transitory computer-readable medium of claim 8, further comprising instructions that result in the computing device recalibrating a quantity of dimensions of the reduced matrix until cluster validation determines the plurality of clusters are a valid clustering of the first customers.

11. The non-transitory computer-readable medium of claim 8, further comprising instructions that result in the computing device recalibrating a quantity of clusters used by the clustering until cluster validation determines the plurality of clusters are a valid clustering of the first customers.

12. The non-transitory computer-readable medium of claim 8, further comprising instructions that result in the computing device:
    generating silhouette numbers for the first customers; and
    determining, based on the silhouette numbers for the first customers, that the plurality of clusters are a valid clustering of the first customers.

13. The non-transitory computer-readable medium of claim 8, further comprising instructions that result in the computing device:
    calculating, for each medoid set, a sum of distances to a nearest medoid of the medoid set; and
    defining the plurality of clusters based on the medoid set that has a smallest sum of distances.

14. A computing device, comprising
    an electronic database comprising demographic data and transaction data for customers; and
    a processor configured to:
    split the customers into a first group comprising first customers who have conducted greater than a predetermined number of transactions and a second group comprising second customers who have not conducted greater than the predetermined number of transactions;
    generate, based on the transaction data of the first customers, a matrix that relates the first customers to purchased products;
    apply principal component analysis to the matrix to obtain a reduced matrix for the first customers;
    generate, in accordance with a clustering large applications (CLARA) algorithm, a plurality of sample sets of the reduced matrix;
    apply a partitioning around medoids (PAM) clustering algorithm to each of the plurality of sample sets to obtain a plurality of medoid sets comprising a medoid set per sample set;

cluster the first customers into a plurality of clusters based upon a medoid set of the plurality of medoid sets; and place each second customer into a cluster of the plurality of clusters based demographic data for the respective second customer and demographic data for the first customers placed in the respective cluster.

15. The computing device of claim 14, wherein the processor is further configured to validate the plurality of clusters prior to placing each second customer into a cluster.

16. The computing device of claim 14, wherein the processor is further configured to recalibrate a quantity of dimensions of the reduced matrix until cluster validation determines the plurality of clusters are a valid clustering of the first customers.

17. The computing device of claim 14, wherein the processor is further configured to recalibrate a quantity of clusters used by the clustering until cluster validation determines the plurality of clusters are a valid clustering of the first customers.

18. The computing device of claim 14, wherein the processor is further configured to:

generate silhouette numbers for the first customers; and determine, based on the silhouette numbers for the first customers, that the plurality of clusters are a valid clustering of the first customers.

19. The computing device of claim 14, wherein the processor is further configured to:

calculate, for each medoid set, a sum of distances to a nearest medoid of the medoid set; and define the clusters of the plurality of clusters based on the medoid set that has a smallest sum of distances.

20. The computing device of claim 14, wherein the processor is further configured to:

calculate, for each medoid set, a sum of Euclidean distances to a nearest medoid of the medoid set; and define the plurality of clusters based on the medoid set that has a smallest sum of Euclidean distances.

* * * * *